US005681649A

United States Patent [19]

Mashita et al.

[11] Patent Number: 5,681,649

[45] Date of Patent: Oct. 28, 1997

[54] FOOTWEAR MEMBER

[75] Inventors: Naruhiko Mashita, Kodaira; Fumio Sato, Tokyo; Satoshi Takezawa, Kodaira; Shinichi Toyosawa, Tokorozawa, all of Japan

[73] Assignee: Bridgestone Corporation, Tokyo, Japan

[21] Appl. No.: 507,837

[22] Filed: Jul. 27, 1995

[30] Foreign Application Priority Data

| | | | |
|---|---|---|---|
| Jul. 29, 1994 | [JP] | Japan | 6-179269 |
| Apr. 5, 1995 | [JP] | Japan | 7-080596 |

[51] Int. Cl.[6] A43B 1/02; B32B 7/02; B32B 25/04

[52] U.S. Cl. 428/212; 36/84; 36/87; 36/89; 36/91; 36/92; 36/72 R; 36/73; 36/75 R; 428/218; 428/220; 428/492

[58] Field of Search 36/84, 87, 89, 36/91, 92, 72 R, 73, 75 R; 524/505; 428/492, 403, 407, 212, 218, 220

[56] References Cited

U.S. PATENT DOCUMENTS 4,208,315 6/1980 Zweig 524/505

*Primary Examiner*—H. Thi Le

*Attorney, Agent, or Firm*—Sughrue, Mion, Zinn, Macpeak and Seas

[57] ABSTRACT

A shoe member is formed of a polymer composition comprising (A) a composite material having a low molecular weight material retained in a medium material and (B) a polymer material. The low molecular weight material has a viscosity of up to $5\times10^5$ centipoise at 100° C. The difference in solubility parameter between the low molecular weight material and the medium material is up to 3.0. The weight ratio of low molecular weight material/medium material is at least 1.0. The difference in solubility parameter between the low molecular weight material and the polymer material is up to 4.0. The weight ratio of low molecular weight material/polymer material is at least 0.5. The polymer composition is enclosed in a rubbery or elastomeric cover particularly when it is used in the outsole.

5 Claims, 2 Drawing Sheets

FOOTWEAR MEMBER

TECHNICAL FIELD

This invention relates to a member for use in footwear, typically sports shoes and more particularly, to a footwear member having improved cushioning properties and affording a pleasant feel to wear.

BACKGROUND

With respect to loose insoles of rubber or other material placed inside footwear articles including leather shoes, chemical shoes, and sports shoes, a number of proposals have been made on the shape and material of insoles for affording minimal fatigue and ease of wearing by effectively absorbing shocks during walking and running.

Especially for sports shoes, cushioning materials are often used in the sole (including insole, midsole and outsole), toe, heel, ankle and vamp sections as well as the loose insole for cushioning and protection purposes.

Cushioning or shock absorbing materials for use as insoles or in the sole or other sections of shoes are conventionally formed of rubber, rubber loaded with lightweight fillers such as cork, urethane, and silicone. These cushioning materials must meet many requirements including a shock absorbing ability, light weight, wear resistance, ease of manufacture, and low cost.

It is then desired to develop a footwear member, typically shoe member, using a cushioning material which is improved in physical properties and commercial productivity.

SUMMARY OF THE INVENTION

Therefore, an object of the present invention is to provide a footwear member comprising a cushioning material which has improved shock absorbing properties and light weight and lends itself to mass production at low cost. The footwear member is typically used in shoes.

According to the present invention, a footwear member for use in footwear articles, typically shoes, is formed of a polymer composition comprising (A) a composite material in which a low molecular weight material is retained in a medium material and (B) a high molecular weight or polymer material. The low molecular weight material has a viscosity of up to $5\times10^5$ centipoise at 100° C. The difference in solubility parameter between the low molecular weight material and the medium material is up to 3.0. The weight ratio of the low molecular weight material to the medium material is at least 1.0. The difference in solubility parameter between the low molecular weight material and the polymer material is up to 4.0. The weight ratio of the low molecular weight material to the polymer material is at least 0.5.

In one preferred embodiment, the polymer material is composed mainly of a thermosetting material. In most cases, the footwear member further includes a cover surrounding a portion or the entirety of the polymer composition. The cover is preferably formed of rubbers such as natural rubber, styrene-butadiene rubber, ethylene-propylene rubber and polybutadiene rubber and thermoplastic or thermosetting elastomers such as urethane, nylon, polypropylene and ethylene vinyl acetate elastomers. The cover material based on such rubber or elastomer may further contain fillers such as carbon and silica and fabrics such as woven and non-woven fabrics. Most preferably the footwear member is disposed in an outsole of a shoe.

Making investigations on the shock absorbing properties of cushioning materials, we have found that the polymer composition defined above has improved physical properties including shock absorbing properties and hardness and is suitable as a footwear member which constitutes a part of the insole, midsole or outsole of a shoe. By using the polymer composition defined herein as a cushioning material, there is obtained a footwear member which is improved in cushioning and economic aspects.

BRIEF DESCRIPTION OF THE DRAWINGS

FIG. 1 illustrates footwear members disposed in an insole.

FIG. 2 illustrates footwear members disposed in a midsole.

FIG. 3 illustrates covered footwear members disposed in an outsole.

FIG. 4 illustrates covered footwear members at other positions.

BEST MODE FOR CARRYING OUT THE INVENTION

Figure 1:
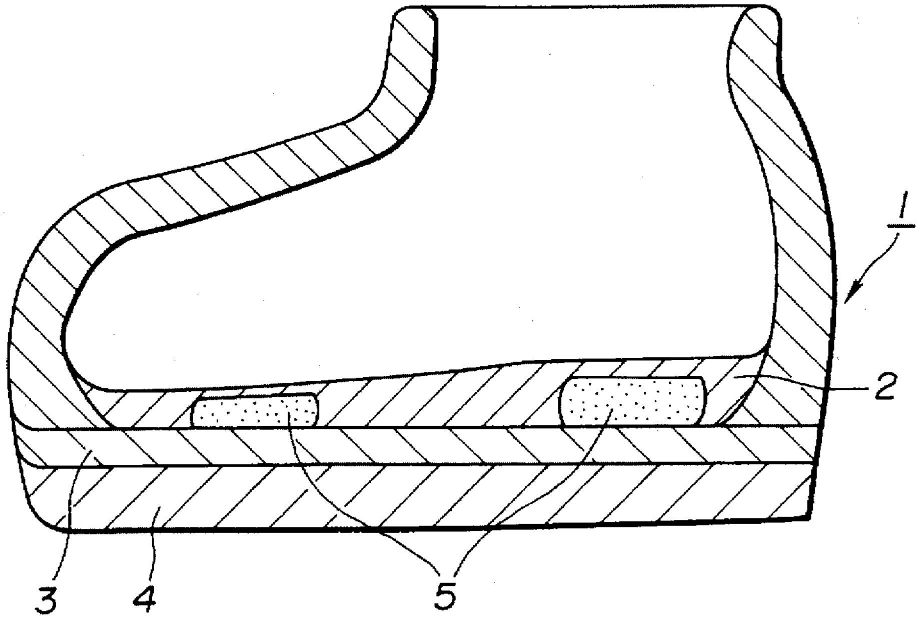
FIGS. 1 to 4 are schematic cross-sectional views of a shoe illustrating the location of footwear members according to the invention.

According to the present invention, a footwear member is formed of a polymer composition comprising (A) a composite material containing a low molecular weight material and a medium material and (B) a polymer material.

The low molecular weight material has a viscosity of up to $5\times10^5$ centipoise at 100° C., preferably up to $1\times10^5$ centipoise at 100° C. From the molecular weight standpoint, it has a number average molecular weight of up to about 20,000, preferably up to about 10,000, more preferably up to about 5,000. Typically low molecular weight materials which are liquid or substantially liquid at room temperature are used. Hydrophilic or hydrophobic low molecular weight materials are also acceptable.

The difference in solubility parameter between the low molecular weight material and the medium material is up to 3.0. The difference in solubility parameter between the low molecular weight material and the polymer material is up to 4.0.

Any of low molecular weight materials which meet the above-mentioned requirements may be used. Though not critical, the following exemplary materials are useful.

(1) Softening material: Softening materials for use in various rubbers and resins include mineral oil, vegetable oil and synthetic oil materials. The mineral oil materials include processing oils of aromatic, naphthene and paraffin systems. The vegetable oil materials include castor oil, cotton seed oil, linseed oil, colza oil, soybean oil, palm oil, coconut oil, peanut oil, haze tallow, pine oil, and olive oil.

(2) Plasticizer: Included are ester plasticizers such as phthalates, phthalic mixed esters, aliphatic dibasic acid esters, glycol esters, fatty acid esters, phosphates, and stearates; epoxy plasticizers; other plasticizers for plastics; and plasticizers for NBR such as phthalates, adipates, sebacates, phosphates, polyethers, and polyesters.

(3) Tackifier: Tackifiers include coumarone resins, coumarone-indene resins, phenol terpene resins, petroleum hydrocarbons, and rosin derivatives.

(4) Oligomer: Oligomers include crown ether, fluorinated oligomers, polyisobutylene, xylene resin, chlorinated polymer, polyethylene wax, petroleum resin, rosin ester polymer, polyalkylene glycol diacrylates, liquid polymers (e.g., polybutadiene, styrene-butadiene polymer, butadieneacrylonitrile polymer, and polychloroprene), silicone oligomers, and poly-α-olefins.

(5) Lubricant: Included are hydrocarbon lubricants such as paraffin and wax; fatty acid lubricants such as higher fatty acids and oxyfatty acids; fatty acid amide lubricants such as fatty acid amides and alkylene bisfatty acid amides; ester lubricants such as fatty acid lower alcohol esters, fatty acid polyhydric alcohol esters and fatty acid polyglycol esters; alcohol lubricants such as aliphatic alcohols, polyhydric alcohols, polyglycols, and polyglycerols; metal soaps; and mixtures.

Other useful low molecular weight materials are latex, emulsion, liquid crystal, bitumen, clay, natural starch, saccharides, inorganic silicone oil, and phosphazine. Also included are organic solvents such as hydrocarbon, halogenated hydrocarbon, alcohol, phenol, ether, acetal, ketone, fatty acid, ester, nitrogen compound and sulfur compound solvents; various pharmaceutical components, soil modifiers, fertilizers, petroleum fractions, water, and aqueous solutions. These materials may be used alone or in admixture.

The type and amount of low molecular weight material may be determined by taking into account the required properties and application as footwear members of a polymer composition as well as compatibility with the remaining components, medium material and polymer material.

The medium material is a material having a function as a medium between the low molecular weight material and the high molecular weight or polymer material. It is a key material in achieving the object of the present invention. In order to blend a large amount of the low molecular weight material with the polymer material so as to form a uniform composition, according to the present invention, a large amount of the low molecular weight material is first blended with the medium material to form a composite material, that is, a composite material of the medium material having a large amount of the low molecular weight material retained therein, and this composite material is then blended with the polymer material to form an end polymer composition which eventually has a large amount of the low molecular weight material retained therein. If a large amount of the low molecular weight material is directly blended with the polymer material, there is obtained a polymer composition in which the low molecular weight material is non-uniformly blended and tends to bleed out, failing to produce a desired polymer composition having a low modulus of elasticity. The term "retention" of the low molecular weight material by the medium material and eventually by the polymer composition means that the low molecular weight material is uniformly dispersed in the medium material or polymer material and does little or not bleed out. A degree of bleeding can be readily controlled depending on the purpose of the polymer composition. Although the mechanism by which the composite material having the low molecular weight material retained therein is uniformly dispersed in the polymer material when they are blended is not well understood, it is believed that the composite material is finely divided into small grains which are retained in the polymer material.

Any desired medium material may be used as long as it has the above-mentioned function and can form a composite material having a large amount of the low molecular weight material retained therein. Typically thermoplastic polymers and compositions containing the same are used. More preferred are thermoplastic organic polymers having a number average molecular weight of more than 20,000, further preferably more than 30,000, especially more than 40,000.

Examples of the medium material include thermoplastic elastomers such as styrene elastomers (e.g., butadiene-styrene and isobutylene-styrene), vinyl chloride elastomers, olefin elastomers (e.g., butadiene, isoprene and ethylene-propylene), ester elastomers, amide elastomers, and urethane elastomers as well as hydrogenated or otherwise modified products thereof; and thermoplastic resins such as styrene resins, ABS resins, olefin resins (e.g., ethylene, propylene, ethylene-propylene, ethylene-styrene, and propylene-styrene), vinyl chloride resins, acrylate resins (e.g., methyl acrylate), methacrylate resins (e.g., methyl methacrylate), carbonate resins, acetal resins, nylon resin, halogenated polyether resins (e.g., chlorinated polyethers), halogenated olefin resins (e.g., ethylene tetrafluoride, ethylene fluoride chloride, and fluorinated ethylene-propylene), cellulose resins (e.g., acetyl cellulose and ethyl cellulose), vinylidene resins, vinyl butyral resins, and alkylene oxide resins (e.g., propylene oxide) and rubber-modified products of these resins.

Preferred thermoplastic polymers are those polymers including both a hard block like a crystalline or agglomerated structure and a soft block like an amorphous structure. Illustrative examples are shown below.

(1) Block copolymers of polyethylene/butylene and an ethylene-styrene random copolymer which are obtained by hydrogenating a block copolymer of polybutadiene and a butadiene-styrene random copolymer (2) Block copolymers of polybutadiene and polystyrene, or block copolymers of polyethylene/butylene and polystyrene which are obtained by hydrogenating a block copolymer of polybutadiene or ethylene-butadiene random copolymer and polystyrene (3) Ethylene-butylene block copolymers with or without a crystalline ethylene block linked at either one or both ends thereof (4) Ethylene-propylene rubber (EPM) and ethylene-propylene-diene terpolymer (EPDM)

Some of the low molecular weight material, medium material and low molecular weight material-retaining medium material composite material are described in JP-A 239256/1993 and 194763/1993. The medium materials having a three-dimensional continuous network skeleton structure disclosed in these patents are also typically used in the present invention.

The medium material used herein may be used in bulk, grain, gel, foam, or non-woven fabric form though not limited thereto. The medium material may have built therein capsules capable of enclosing the low molecular weight material.

In preparing a composite material containing a large amount of the low molecular weight material and the medium material, these two components are selected such that the difference in solubility parameter between the low molecular weight material and the medium material is up to 3.0, preferably up to 2.5. If the difference in solubility parameter exceeds 3.0, it becomes difficult from the compatibility point of view to effectively retain a large amount of the low molecular weight material, resulting in a polymer composition which is not fully reduced in modulus of elasticity and which allows the low molecular weight material to bleed out.

The weight ratio of the low molecular weight material to the medium material is at least 1.0, preferably at least 2.0, more preferably at least 3.0. With a weight ratio of less than 1.0, it is difficult to obtain a low modulus of elasticity polymer composition, failing to achieve the object of the invention.

Any desired method may be used in preparing the composite material of low molecular weight material and medium material depending on the type and properties of the two components and mixing ratio. An optimum method may be selected from well-known methods including the one described in JP-A 239256/1993.

Use of a high shearing special mixer as disclosed in Japanese Patent Application No. 316461/1993 is recommended. More particularly, a thermoplastic polymer material or medium and a low molecular weight material are kneaded by means of a high shearing special mixer having an ability to rotate the rotor at a shear rate of at least $5.0\times10^2$ $sec^{-1}$, thereby obtaining a low molecular weight material-retaining composite material which has a large amount of the low molecular weight material uniformly distributed therein and is minimized in bleeding of the low molecular weight material.

The polymer material (B) to be blended with the low molecular weight material-retaining composite material (A) is not critical and may be selected from conventional thermoplastic and thermosetting materials.

Among them, the thermoplastic materials include the thermoplastic resins previously described as examples of the medium material, i.e., (1) Block copolymers of polyethylene/butylene and an ethylene-styrene random copolymer which are obtained by hydrogenating a block copolymer of polybutadiene and a butadiene-styrene random copolymer, (2) Block copolymers of polybutadiene and polystyrene, or block copolymers of polyethylene/butylene and polystyrene which are obtained by hydrogenating a block copolymer of polybutadiene or ethylene-butadiene random copolymer and polystyrene, (3) Ethylene-butylene block copolymers with or without a crystalline ethylene block linked at either one or both ends thereof, and (4) Ethylene-propylene rubber (EPM) and ethylene-propylene-diene terpolymer (EPDM), and rubber-modified products of these resins.

Examples of the thermosetting material, that is, material which thermosets in the presence or absence of a curing agent, include conventional rubbers such as ethylene-propylene rubber (EPM and EPDM), nitrile rubber, butyl rubber, halogenated butyl rubber, chloroprene rubber (CR), natural rubber (NR), isoprene rubber (IR), styrene-butadiene rubber (SBR), butadiene rubber (BR), acryl rubber, ethylene-vinyl acetate rubber (EVA), and urethane rubber (UR); special rubbers such as silicone rubber, fluorine rubber, ethylene-acryl rubber, polyester elastomer, epichlorohydrin rubber, polysulfide rubber, Hypalon (chlorosulfonated polyethylene by E.I. dupont de Nemours & Co., Inc.), and chlorinated polyethylene; and various other thermosetting resins such as phenol, urea, melamine, aniline, unsaturated polyester, diallyl phthalate, epoxyalkyd, silicon and imide resins. These thermosetting materials may be used alone or in admixture of two or more.

For these thermosetting materials, any of well-known curing agents such as sulfur, organic peroxides, and nitroso compounds may be used. If desired, rubber chemicals such as vulcanization promoters, age resisters, anti-oxidants, and UV absorbers may be used. Also, depending on a particular purpose, various tackifiers, plasticizers, rubber softeners, rubber reinforcements, and fillers may be blended as well as foaming agents, flame retardants, antistatic agents, and coloring agents.

According to the present invention, the low molecular weight material and the polymer material are selected such that the difference in solubility parameter between the low molecular weight material and the polymer material is up to 4.0, preferably up to 3.0. Although the low molecular weight material is blended with the polymer material after it is converted into a composite material with the medium material, the compatibility between the low molecular weight material and the polymer material is still a problem. If the difference in solubility parameter exceeds 4.0, it becomes difficult from the compatibility point of view for the polymer material to effectively retain a large amount of the low molecular weight material retained in the composite material, resulting in a polymer composition which is not fully reduced in modulus of elasticity and which allows the low molecular weight material to bleed out.

The weight ratio of the low molecular weight material (in the composite) to the polymer material is at least 0.5, preferably at least 0.8, more preferably at least 1.0. With a weight ratio of less than 0.5, it is difficult to obtain a low modulus of elasticity polymer composition, failing to achieve the object of the invention.

Desirably the polymer composition of the invention contains at least 30% by weight of the polymer material.

Any desired method may be used in blending the low molecular weight material-retaining composite material with the polymer material depending on the properties of the two components and mixing ratio. An optimum method may be selected from well-known methods. After the low molecular weight material-retaining composite material is blended with the polymer material, vulcanization curing of rubber is performed if necessary, obtaining a polymer composition according to the present invention.

Any desired conventional additive may be added to the polymer composition according to the present invention. Such additives include flake inorganic fillers such as clay, diatomaceous earth, carbon black, silica, talc, barium sulfate, calcium carbonate, magnesium carbonate, metal oxides, mica, graphite, and aluminum hydroxide; granular or powder solid fillers such as various metal particulates, wood chips, glass powder, ceramic powder, and granular or powder polymers; natural and synthetic, short and long fibers such as straw, wool, glass fibers, metal fibers, and polymer fibers. In a particular application, dyes such as fluorescent dyes, luminous dyes, and phosphorescent dyes may be blended for coloring.

Also hollow fillers including hollow inorganic fillers such as glass balloons and silica balloons, and hollow organic fillers such as polyvinylidene fluoride and vinylidene fluoride copolymers may be blended for reducing the overall weight of the composition. Also for weight reduction and improvements in other physical properties, foaming agents may be blended. It is also possible to mechanically incorporate bubbles during mixing of components.

The polymer composition shaped as a cushioning member constituting a footwear member according to the present invention preferably has a dissipation factor ($\tan\delta$) of 0.01 to 1.0. A member with a $\tan\delta$ of less than 0.01 would be less shock absorptive upon grounding whereas a member with a $\tan\delta$ of more than 1.0 would require an extra force to kick the ground forward. The members are not suitable for footwear in either case. It is to be noted that the dissipation factor ($\tan\delta$) is a measurement by a shearing dynamic viscoelastic meter (manufactured by Toyo Seiki K.K.) at 25° C. and 5 Hz.

The footwear member according to the invention is not particularly limited in construction. The member may be made solely of the polymer composition defined above. The member may have a layered structure which is formed by combining the polymer composition with a conventional plastic or rubber material (cushioning material) such as polyurethene, silicone, polyethylene, ABS, PP and nylon in either solid or expanded form. Also the polymer composition may be combined with metal materials such as iron, aluminum, copper, zinc and stainless steel or ceramic materials. Alternatively, a body of the polymer composition is coated with a cover of organic materials, for example, rubber and elastomers such as urethane resins, polyvinyl acetate, silicone, ethylene-vinyl acetate (EVA) copolymers, and nylon. The cover material may take the form of fabric or skin. The footwear member may also be combined with spring elements such as pneumatic springs and spring structures, typically metal springs.

The footwear member of the invention may be used at any position of a footwear article. The footwear member may be configured to any desired shape and placed at any desired position. For example, it may be used as a cushioning member in an insole, midsole or outsole of a shoe. If desired, it may be used in combination with the same or another cushioning member.

Figure 2:
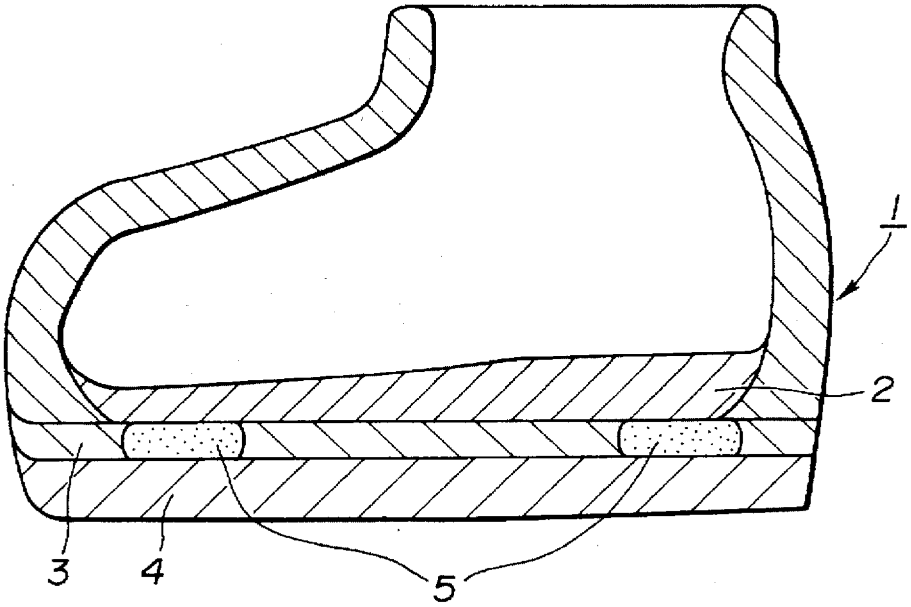
Figure 3:
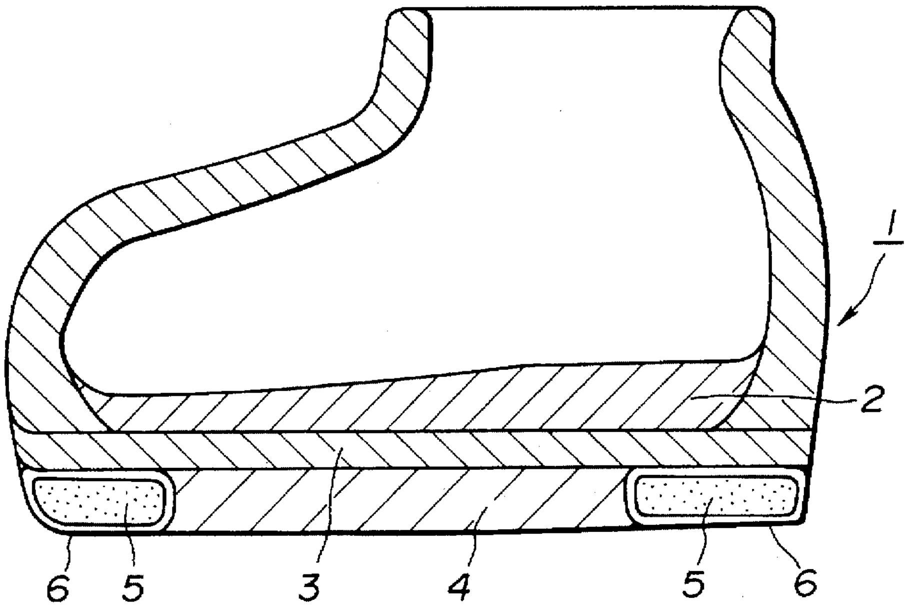
Figure 4:
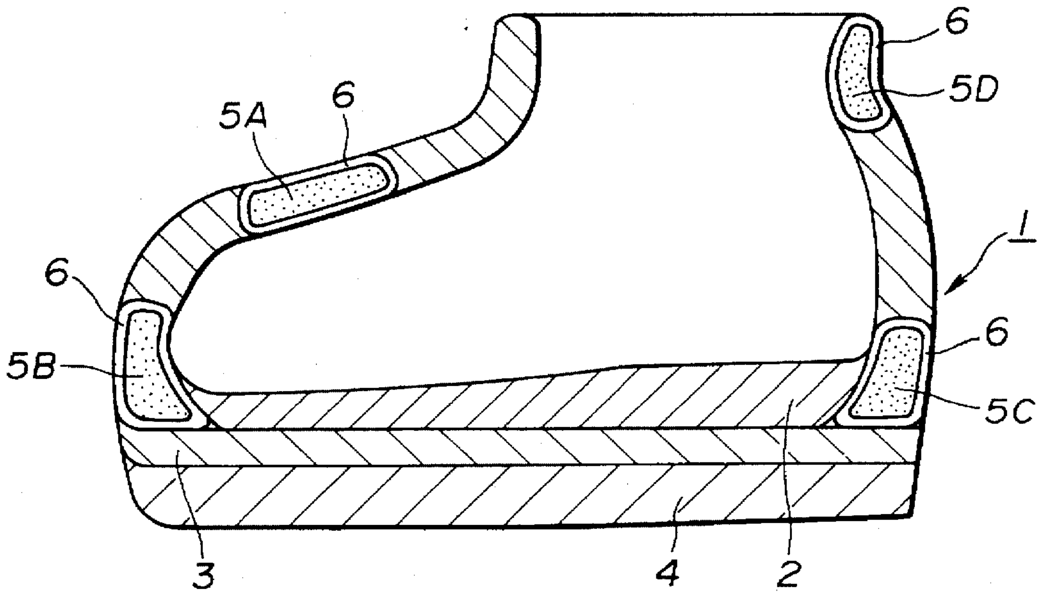

Referring to FIGS. 1 through 4, there is illustrated a footwear member of the polymer composition according to the invention which is disposed in a shoe at different positions. Illustrated in these schematic cross-sectional views is a shoe 1 having the sole including an insole 2, a midsole 3, and an outsole 4. In FIG. 1, members 5 are disposed in the insole 2 at the tread and heel areas. In FIG. 2, members 5 are disposed in the midsole 3 at the tread and heel areas. In FIG. 3, covered members 5 are disposed in the outsole 4 at the toe and heel areas. In FIG. 4, covered members 5 are disposed in vamp, toe, heel, and ankle areas as depicted at 5A, 5B, 5C, and 5D, respectively.

Where the footwear member of the invention is used as a cushioning member in the outsole as shown in FIG. 3, the member is preferably comprised of a body of the polymer composition which is partially or entirely surrounded by a cover 6 of rubber or elastomer. While the body of the polymer composition is improved in cushioning properties, the cover thereon acts to reduce bleeding, adds an elastic element to the member to reduce bottoming feel and supplements or reinforces the body for increased wear resistance.

The cover may be formed on at least a portion of the body of the polymer composition, for example, by shaping the cover material into a container or bag and casting the polymer composition into the container or bag, optionally followed by vulcanization and curing. Alternatively, a cover layer is adhesively joined to a preform of the polymer composition. It is also possible to simultaneously mold the polymer composition and the cover material.

Although the body of the polymer composition 5 is entirely surrounded by the cover layer 6 in the illustrated embodiments, a footwear member in which a body of the polymer composition is coated with a cover only over its tread or bottom area for increasing wear resistance is acceptable when it is used in the outsole.

The footwear member of the invention comprising the polymer composition and having cushioning properties is placed at a desired position in a shoe, for example, by forming the polymer composition into a sheet of a suitable thickness, punching or cutting the sheet into a piece of suitable size, and placing the piece at the desired position. Alternatively, the polymer composition is admitted into a mold of desired shape, molded therein, and cooled, whereupon the molded part is placed at the desired position. Also, the polymer composition may be directly admitted into a cavity in a sole component to form an integral sole component.

The footwear member of the invention is suitable in all articles of footwear including leather shoes, chemical shoes, sports shoes, and sandals. Because of its shock absorbing ability, the footwear member offers a lasting shoe with a pleasant feel to wear.

According to the invention, a footwear member is basically formed of a polymer composition comprising, in admixture, low molecular weight material-retaining medium material composite material (A) and polymer material (B). The member is soft enough. It is also improved in elasticity, compression, hardness and cushioning for footwear application. It can be manufactured on a mass scale in an economically acceptable manner. It is further improved in moldability and recycle use particularly when a thermoplastic polymer material is used.

In the preferred embodiment wherein the polymer composition is partially or entirely covered with rubber or elastomer, the cover suppresses bleeding of the polymer composition, adds an elastic element to the member to reduce bottoming feel, and supplements wear resistance when used in the outsole. More particularly, when the polymer composition having improved cushioning ability is provided with a cover and used in the outsole of a shoe, the shoe not only possesses wear resistance attributable to the cover and shock absorption attributable to the polymer composition, but also has a good balance of grip, ease, fitting, and cushioning. Such shoes significantly reduce the burden to the wearer, minimizing the fatigue of the feet, knees and loins.

EXAMPLE

Examples of the present invention are given below by way of illustration and not by way of limitation.

Examples 1–4

A low molecular weight material and a medium material in amounts as shown in Table 1 were kneaded by means of a high shearing special mixer (T.K. Auto-Homomixer by Tokushu Kiko Kogyo K.K.) under conditions as shown in Table 2, obtaining a low molecular weight material-retaining composite material. The composite material was observed under an electron microscope to find a three-dimensional continuous network skeleton structure having the low molecular weight material trapped therein.

TABLE 1

| Composite material | Solubility parameter | Amount (wt %) |
|---|---|---|
| Low molecular weight material | | |
| Aromatic synthetic oil | 8.3 | 40 |
| Fatty acid ester plasticizer | 8.4 | 40 |
| Medium material | 8.5 | 20 |
| Block copolymer | | |

Note:
The aromatic synthetic oil is available from Nihon Sun Petroleum K.K. as Z-300 and has a molecular weight of 300.
The fatty acid ester plasticizer is available from Daihachi Kagaku K.K. as DIDA and has a molecular weight of 412.

The block copolymer consists of an ethylene/styrene random copolymer and polyethylene/butylene obtained by hydrogenating a block copolymer of polybutadiene with a butadiene/styrene random copolymer and has a molecular weight of 120,000.

TABLE 2

| Kneading conditions | |
|---|---|
| Number of revolutions | 6,000 rpm |
| Shear rate | $2.0 \times 10^4$ $sec^{-1}$ |
| Mixing temperature | 170° C. |
| Mixing time | 30 min. |

Next, the low molecular weight material-retaining composite material was kneaded with a polymer material in amounts as shown in Table 3 by means of a Brabender mixer under conditions as shown in Table 4, obtaining polymer compositions. The polymer compositions of Examples 1–4 all had a dissipation factor (tanδ) of 0.1.

TABLE 3

| | Amount (parts by weight) | | | |
|---|---|---|---|---|
| Polymer composition | E1 | E2 | E3 | E4 |
| Rubber material | | | | |
| Natural rubber | 100 | 60 | — | 100 |
| Butyl rubber | — | 40 | — | — |
| Styrene-butylene rubber | — | — | 100 | — |
| Additive | | | | |
| Filler | 40 | 40 | 40 | 40 |
| Vulcanizer | 2.5 | 2.5 | 2.5 | 2.5 |
| Composite material | 140 | 100 | 100 | 50 |

TABLE 4

| Kneading conditions | |
|---|---|
| Number of revolutions | 40 rpm |
| Mixing temperature | 45° C. |
| Mixing time | 12 min. |

The polymer compositions were evaluated by placing them in the insole, midsole and outsole of shoes as shown in FIGS. 1 to 3. When the compositions of Examples 1 and 2 were used in the insole, the composition of Example 3 was used in the midsole, and the composition of Example 4 was used in the midsole and outsole, the shoes were well shock absorptive to the foot bottom and comfortable to wear, causing minimal foot fatigue after long walking as compared with conventional shoes.

The polymer compositions shown in Table 3 were coated with covers as shown in Table 5 to form covered footwear members, which were used in the outsole of shoes. In addition to the advantages mentioned above, it was found that the cover suppressed bleeding of the polymer composition and increased wear resistance.

TABLE 5

| | Amount (parts by weight) | | | |
|---|---|---|---|---|
| Polymer composition | E1 | E2 | E3 | E4 |
| Rubber material | | | | |
| Natural rubber | 100 | 60 | — | 100 |
| Butyl rubber | — | 40 | — | — |
| Styrene-butylene rubber | — | — | 100 | — |
| Additive | | | | |
| Filler | 40 | 40 | 40 | 40 |
| Vulcanizer | 2.5 | 2.5 | 2.5 | 2.5 |
| Composite material | 140 | 100 | 100 | 50 |
| Cover | | | | |
| NR | 100 | — | 100 | — |
| SBR | — | 100 | — | 100 |
| Filler | 30 | 30 | 30 | 30 |
| Vulcanizer | 10 | 10 | 10 | 10 |

Since the footwear member of the invention is a cushioning member of the polymer composition having an improved shock absorbing ability, shoes having such footwear members incorporated therein are well shock absorptive and comfortable to wear, causing minimal foot fatigue after long walking. The polymer composition is cost effective to manufacture. In particular, the polymer composition having a cover of rubber or elastomer provides an improved footwear member possessing both the cushioning properties of the polymer composition and the anti-bleeding and wear resistance of the cover when it is used in the outsole.

Japanese Patent Application Nos. 179269/1994 and 80596/1995 are incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A footwear member comprising a polymer composition including (A) a composite material having a low molecular weight material retained in a medium material and (B) a polymer material, wherein said low molecular weight material has a number average molecular weight of up to about 20,000 and a viscosity of up to $5\times10^5$ centipoise at 100° C., and the difference in solubility parameter between said low molecular weight material and said medium material is up to 3.0, the weight ratio of said low molecular weight material to said medium material is at least 1.0, the difference in solubility parameter between said low molecular weight material and said polymer material is up to 4.0, and the weight ratio of said low molecular weight material to said polymer material is at least 0.5.

2. The footwear member of claim 1 wherein said polymer material is composed mainly of a thermosetting material.

3. The footwear member of claim 1 wherein said polymer material is composed mainly of a thermoplastic material.

4. The footwear member of claim 1 further comprising a cover surrounding at least a portion of said polymer composition.

5. The footwear member of claim 4 wherein said cover is formed of a rubber or elastomer.

* * * * *